(12) United States Patent
Yagawa

(10) Patent No.: US 7,913,052 B2
(45) Date of Patent: Mar. 22, 2011

(54) METHOD AND APPARATUS FOR REDUCING THE AMOUNT OF DATA IN A STORAGE SYSTEM

(75) Inventor: Yuichi Yagawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 152 days.

(21) Appl. No.: 12/254,900

(22) Filed: Oct. 21, 2008

(65) Prior Publication Data
US 2009/0043983 A1  Feb. 12, 2009

Related U.S. Application Data

(63) Continuation of application No. 11/385,794, filed on Mar. 22, 2006, now Pat. No. 7,457,934.

(51) Int. Cl.
*G06F 12/00* (2006.01)
(52) U.S. Cl. .................. 711/170; 711/E12.002
(58) Field of Classification Search .................. 711/154, 711/162, 165, 170, 202, 203, E12.001, E12.002; 707/E17.005, 999.202
See application file for complete search history.

(56) References Cited

U.S. PATENT DOCUMENTS

| 5,555,389 | A | 9/1996 | Satoh et al. |
| 5,649,152 | A | 7/1997 | Ohran et al. |
| 6,704,730 | B2 | 3/2004 | Moulton et al. |
| 6,826,711 | B2 | 11/2004 | Moulton et al. |
| 7,085,904 | B2 | 8/2006 | Mizuno et al. |
| 7,100,089 | B1 * | 8/2006 | Phelps ............................ 714/42 |
| 7,200,725 | B2 | 4/2007 | Maruyama et al. |
| 7,272,693 | B2 | 9/2007 | Ushijima et al. |
| 2005/0223170 | A1 | 10/2005 | Ushijima et al. |
| 2007/0083567 | A1 * | 4/2007 | Arai et al. ..................... 707/200 |
| 2008/1281879 | * | 8/2008 | Phelps et al. ................... 714/12 |

OTHER PUBLICATIONS

Arya, S. et al, "An Optimal Algorithm for Approximate Nearest Neighbor Searching in Fixed Dimensions", Journal of the ACM (JACM). v. 45 n., Nov. 1998, pp. 891-923.

* cited by examiner

*Primary Examiner* — Pierre-Michel Bataille
(74) *Attorney, Agent, or Firm* — Mattingly & Malur, P.C.

(57) ABSTRACT

Groups of volumes having a certain amount of commonality of data are identified within a storage system. For each group, the process defines a base volume, such as the volume containing the most commonality with the other volumes. For each volume in the group, the process extracts differential data between the base volume and each other volume, saves the differential data in a pool volume, and updates a mapping table. Commonality between volumes in the group is managed in the base volume, the pool volume, and the mapping table. Then the original volumes except the base volume and the pool volume may be deleted, and the original volumes are replaced with virtual volumes accessible through the mapping table. As a result, the amount of data in a storage system can be reduced while maintaining data integrity and accessibility.

6 Claims, 9 Drawing Sheets

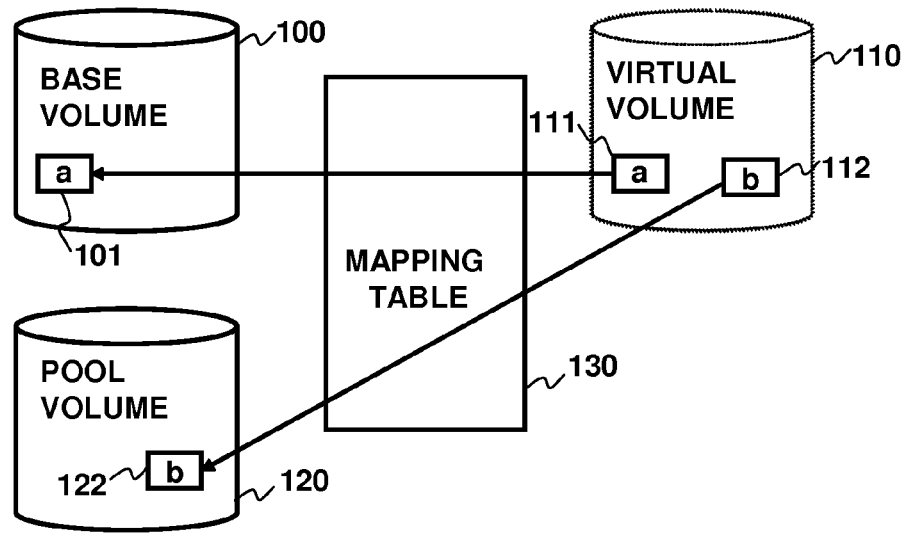
FIG. 2 (Related Art)
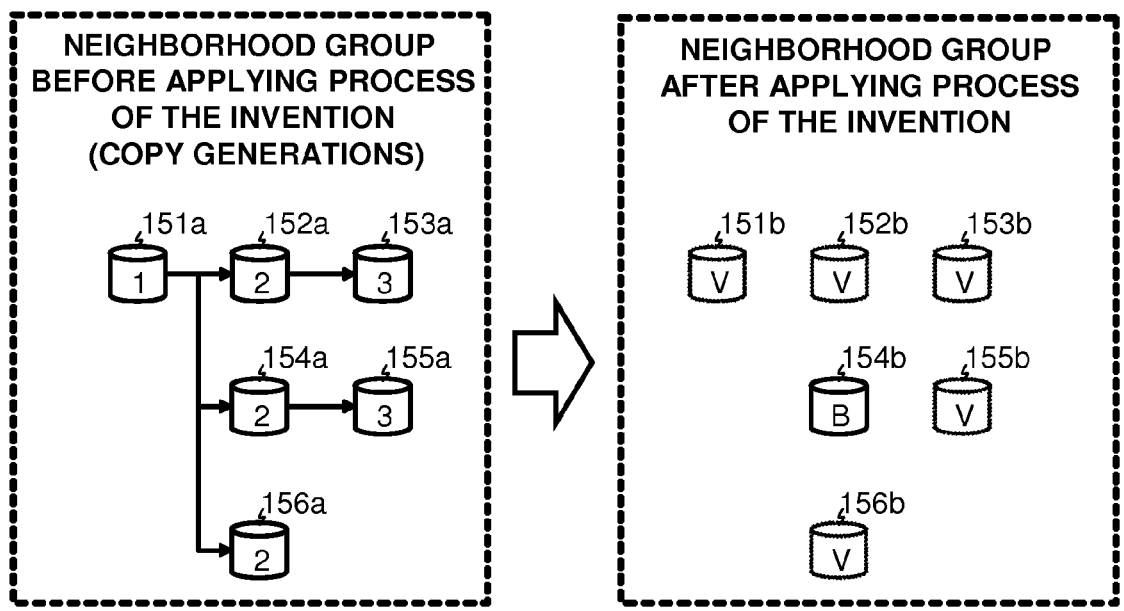
FIG. 3A           FIG. 3B

B: Base Volume
V: Virtual Volume
P: Volume Pool

METHOD AND APPARATUS FOR REDUCING THE AMOUNT OF DATA IN A STORAGE SYSTEM

CROSS-REFERENCES

This is a continuation application of U.S. Ser. No. 11/385,794, filed Mar. 22, 2006 (now U.S. Pat. No. 7,457,934, which is hereby incorporated by reference.

BACKGROUND OF THE INVENTION

1. Field of the Invention

The present invention is generally related to a storage system and in particular to a method and apparatus for reducing the amount of data stored in the storage system.

2. Description of the Related Art

A main concern of many storage administrators is rapid data growth, wherein the amount of data stored in a storage system increases so rapidly that it threatens to outstrip the capacity of the storage system. For example, data growth in some industries can be as high as 30-50 percent per year, which can require frequent upgrades and increases in the capacity of storage systems. Furthermore, increases in the amount of data stored in a storage system also causes increases in management costs for managing the data. Thus, it would be desirable to decrease the amount of data stored in storage systems, thereby decreasing the management costs and decreasing the required frequency of system upgrades.

One cause of the recent increases in the amount of data being stored in enterprise datacenters is data vaulting or long term data preservation. It has become more essential for many businesses to keep data for long periods of time, and their motivations for long-term data preservation are often due to governmental regulatory requirements and similar requirements particular to a number of industries. Examples of some such government regulations that require long-term data preservation include SEC Rule 17a-4, HIPAA (The Health Insurance Portability and Accountability Act), and SOX (The Sarbanes Oxley Act). The data required to be preserved is sometimes referred to as "Fixed Content" or "Reference Information", which means that the data cannot be changed after it is stored. This can create situations different from an active database, wherein the data may be dynamically updated as it is changed.

Another reason for recent increases in the amount of data being stored is data replication, mirroring or copying. In order to improve data accessibility, reliability, and the like, businesses keep one or more copies of data. Sometimes data is replicated periodically at a certain point in time, and the replicated data and the function itself are called a "snapshot" or "point-in-time copy" (PiT copy). For example, some businesses may sometimes keep more than three or four different copies and a number of different generations of data within their datacenters. Accordingly, preserving copied data for the long term is another main cause leading to rapid growth in the amount of stored data.

One well-known prior-art technology for reducing the amount of copied data is Copy On Write (COW) technology. COW is a technique for maintaining a point-in-time copy of a collection of data by copying only data which is modified or updated after the instant of replicate initiation. The original source data is used to satisfy read requests for both the source data itself and for the unmodified portion of the point in time copy. Because only differential data are kept in the storage system, the amount of redundant data can be reduced (see, e.g., www.snia.org/education/dictionary/c/). An example of a product that uses COW is QuickShadow™ available from Hitachi Data Systems Corporation of Santa Clara, Calif. Prior art patents related to COW include U.S. Pat. No. 5,649,152 to Ohran et al. and U.S. Pat. No. 5,555,389 to Satoh et al., the disclosures of which are incorporated herein by reference.

Furthermore, it is known to use a technology called "pointer remapping" in COW systems. Pointer remapping is a technique for maintaining a point in time copy in which pointers to all of the source data and copy data are maintained. When data is overwritten, a new location is chosen for the updated data, and the pointer for that data is remapped to point to it. If the copy is read-only, pointers to its data are never modified (see, e.g., www.snia.org/education/dictionary/p/).

FIG. 2 illustrates a basic pointer remapping technique used in a snapshot COW system. This technique includes a base volume 100, which is a volume referred by the snapshot, a virtual volume 110, which is a window volume for a host to access the snapshot, having no physical disk space, and a pool volume 120, which is a set of logical volumes storing differential data between the base volume and the snapshot. A mapping table 130 is stored in a memory area containing mapping information and snapshot control information. Pointer 111 is a reference to data 101 in the base volume 100, defined in the mapping table 130, while pointer 112 is a reference to data 122 in the pool volume 120, defined in the mapping table 130. When data is updated, a new location is designated for the updated data, and the pointer for that data is remapped in the mapping table so as to point to the location of the updated data.

However, conventional COW techniques do not work to reduce the amount of data already stored in storage systems. Although COW is a well-accepted technology in storage systems, COW is in operation only when the storage systems write data to disk. The COW technology has not been applied for reducing the amount of data that is already stored in a storage system.

Other techniques for reducing the amount of stored data in storage systems are also known. For example, it is also known in certain applications to use data commonality factoring, coalescence or de-duplication technology to discover any commonality in a storage system. Once the commonality is discovered, the redundant data may be eliminated to reduce the amount of data in the storage system. In order to find commonality, chunking (cutting data into smaller sizes of data) and hashing technologies may be used. Examples of the companies providing such technologies are Avamar Technologies, Inc. of Irvine, Calif., Data Domain of Palo Alto, Calif., Diligent Technologies of Framingham, Mass., and Rocksoft of Adelaide, Australia. Patents disclosing related technologies include U.S. Pat. No. 6,826,711 to Moulton et al. and U.S. Pat. No. 6,704,730 to Moulton et al., the disclosures of which are incorporated herein by reference.

However, the coalescence technology described in the above-referenced patents requires new investment to enable them to be implemented in storage systems. Since the technology is new and not widely employed, it requires additional research and development costs, and, as a result, customers may be asked to pay more. Accordingly, there is a need for a technology that enables reducing the amount of data stored in storage systems and that leverages existing technologies to reduce development costs.

Further, it is known to use algorithms and mathematical techniques for searching and classifying the nearest neighbor among a set of data structures. For example, the paper "An Optimal Algorithm for Approximate Nearest Neighbor Searching in Fixed Dimensions", by Sunil Arya et al., *Journal of the ACM (JACM)*, v. 45 n. 6, p. 891-923, November 1998, discusses techniques for calculating a nearest neighbor using a balanced box-decomposition tree. These and similar mathematical techniques, generally known as the "nearest neighbor method", may be applied to the storage system environment for classifying storage volumes into neighborhood groups having a desired degree of commonality, as will be described in more detail below in the Detailed Description of the Invention.

BRIEF SUMMARY OF THE INVENTION

According to an embodiment of the present invention, for reducing the amount of data stored in a storage system, groups of neighborhood volumes identified to contain a certain amount of commonality to each other are selected. For each neighborhood group, a base volume is identified, such as the volume containing the most commonality with other member volumes of the group. Then, for each volume in the group, the system extracts differential data between the base volume and each volume, saves the differential data in a pool volume, and updates a mapping table. Within the neighborhood group, following completion of extraction and mapping of the differential data, any existing volumes except the base volume may be eliminated, and data integrity of those volumes is maintained as virtual volumes in the mapping table.

Thus, under one aspect of the invention, the commonality between the volumes in the neighborhood group is appropriately managed in the base volume, the pool volume, and the mapping table. Then the original volumes except the base volume and the pool volume can be deleted, and, as a result, the amount of data in a storage system can be reduced while maintaining data accessibility.

These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 2 illustrates a basic technique for pointer remapping.

FIG. 3A illustrates an exemplary neighborhood group before application of the process of the invention.

FIG. 3B illustrates the neighborhood group of FIG. 3A after application of the process of the invention.

DETAILED DESCRIPTION OF THE INVENTION

Figure 1:
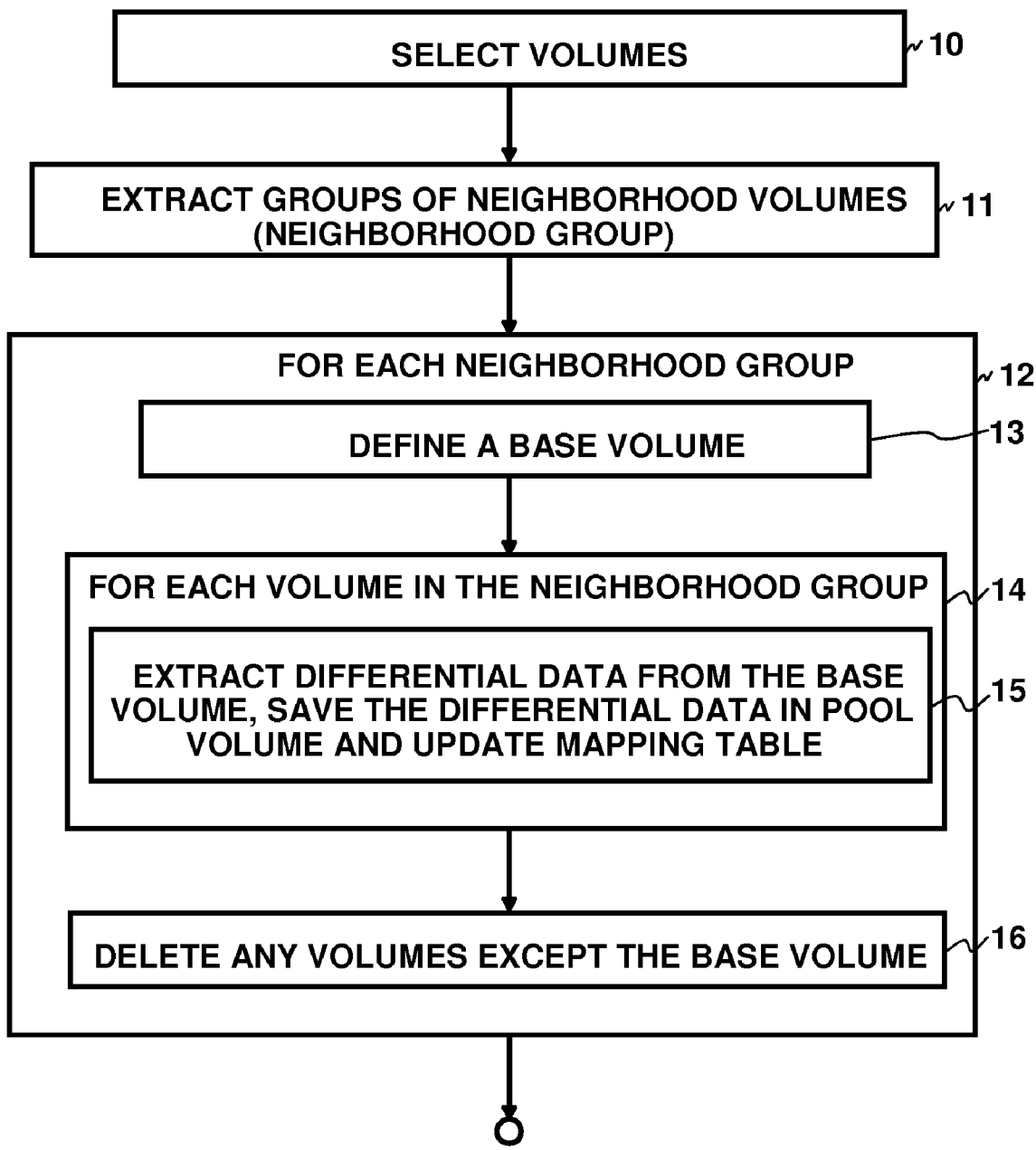
FIG. 1 illustrates an overall process of a first embodiment of the invention.

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any fashion.

First Embodiment

Overall Process

FIG. 1 illustrates an exemplary overall process of a first embodiment of the invention. In step 10, a user or the storage system selects volumes in which the amount of stored data should be reduced. For example, a user may specify a set of volumes which may contain a lot of data redundancy, or the system may automatically discover those volumes using configuration information of data replication. An example of a data replication product from which such information may be obtained is Hitachi ShadowImage™, discussed above. The replication information usually contains copy generation information, which may be used to locate data commonality between the volumes.

Once a set of volumes is selected or specified, then in step 11, the system extracts groups of neighborhood volumes. The neighborhood volumes are defined as volumes of which distances from the mode are less than a threshold. In other words, the volumes are recognized to contain a certain amount of commonality to each other. The process will be explained further with reference to FIG. 4 and thereafter.

Step 12 indicates that for each neighborhood group extracted, steps 13-16 are carried out. Thus in step 13, for an extracted neighborhood group, the system defines a base volume. The base volume may be close to the mode in the neighborhood group. In other words, the base volume may contain the most commonality with other member volumes. In another embodiment, the base volume can be newly created to keep the most commonality with other member volumes. The process will be explained further with reference to FIGS. 5A-5B and thereafter.

Step 14 indicates that step 15 is carried out for each volume in the neighborhood group. In step 15, for each volume in the neighborhood group, the system extracts differential data between the base volume and that volume, saves the differential data in the pool volume, and updates mapping table. The process will be explained further with reference to FIG. 6 and thereafter.

In step 16, within the neighborhood group, any existing volumes except the base volume may be eliminated. Data integrity of those volumes is kept in the mapping table. The commonality between volumes in the neighborhood group is appropriately managed in the base volume, the pool volume and the mapping table. Then, the original volumes except the base volume and the pool volume may be deleted, and as a result, the amount of data stored in the system can be reduced while maintaining data accessibility.

FIGS. 3A and 3B illustrate an exemplary function of the present invention. FIG. 3A shows a set of copy generation volumes 151a-156a prior to application of the present invention. In FIG. 3A, the directions of the arrows indicate the copy direction, and the increase in volume numerals 1, 2 and 3 indicate later generations, i.e., generations 1, 2 and 3, respectively. Also, the volumes 151a-156a are preferably off-line prior to implementation of the invention, and not storing any new write I/Os from hosts, at least during execution of the process of the invention. Otherwise, managing updated data while also carrying out the process of the invention would require the method and apparatus of the invention to be more complex. Accordingly, write I/Os may be buffered during execution of the process of the invention, or the invention may be carried out on inactive archival volumes.

FIG. 3B illustrates an image of the volumes in the neighborhood group after carrying out the process of the invention. The volume 154b was selected as the base volume, and other volumes 151b-153b and 155b-156b have been converted into virtual volumes. Since the virtual volumes do not consume any actual disk space except the pool volume and the mapping table, the process of the invention can reduce amount of data where there is a large degree of commonality among the volumes in a neighborhood group.

Further, it should be noted that the volume 154b was set to be the base volume in spite of the fact that the volume 151b would normally be the base volume in the case of conventional COW technology, since it is the original parent volume. However, the process of the present invention is not necessarily required to keep or abide by copy generation information, so the process can set as the base volume any volume which is mode in the neighborhood group (i.e., the volume that has the greatest degree of commonality among the volumes in the neighborhood group).

Process of Extracting Neighborhood Groups

Figure 4:
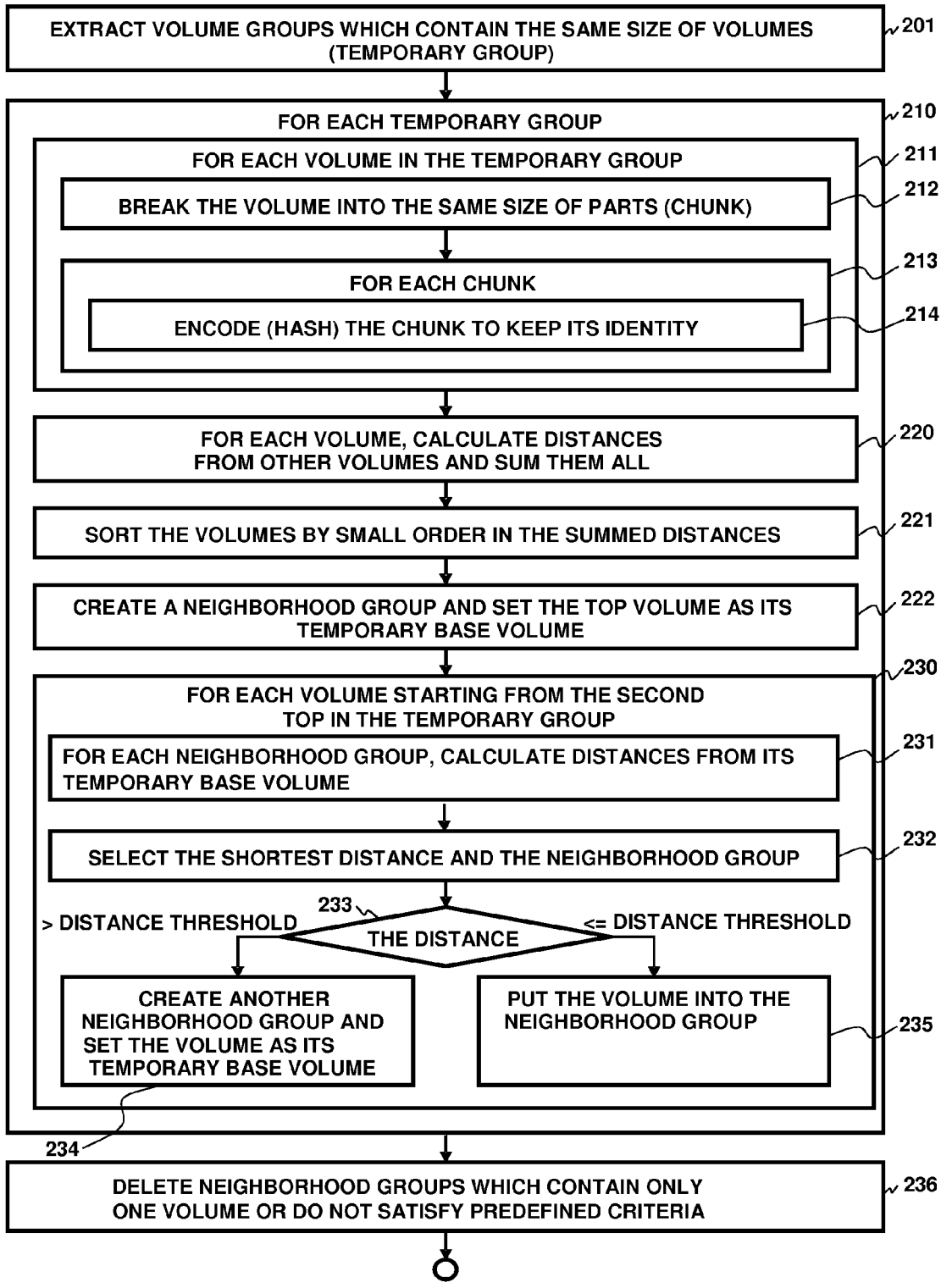
FIG. 4 illustrates an exemplary process of extracting a neighborhood group.

FIG. 4 illustrates an exemplary process of extracting a neighborhood group. Basically, the process calculates the distance in commonality between volumes, and categorizes volumes based on the calculated distance. In order to calculate the distance, the volumes may be broken into the same size of chunks, the chunks are hashed into codes, the codes are compared, and the number of matched codes indicates how close the distance is. The preferred method of calculating the distance is referred to as vector matching or vector quantization. Under this technique, the set of codes are defined as a vector or scalar. The distance between the scalars is then calculated as a vector product to achieve a numerical quantification of distance.

Under the process illustrated in FIG. 4, in step 201, the system extracts volume groups which contain the same size of volumes and sets each such volume group as a temporary group to be examined for commonality. When determining the volumes to be included in a temporary group, under one technique, the temporary group may be specified by a user. Alternatively, the system may discover copy configuration files, understand the copy relation between volumes, and define the volumes having a particular copy relation as a temporary group. Other methods may also be used for determining a temporary group in step 201.

In step 210, a process of examination and comparison for commonality of the volumes in the temporary group is carried out for each temporary group identified, as set forth in steps 211-234. In step 211, for each volume in the temporary group, steps 212-214 are carried out. In step 212, the volume is broken into data chunks having a predetermined size. For example, the size of a data chunk may be the same size as, or a multiple number of, the I/O block size, such as 512 bytes, or a multiple of 512 bytes, such as 1028 bytes, 4096 bytes, etc. Then, in step 213, for each chunk of the volume, the chunk is encoded to maintain the identity of the chunk, as indicated by step 214. In a preferred method, hashing may be used to encode the chunk to represent approximate data content. Examples of known hashing methods that may be applied to the present invention are MD5, SHA-1, SHA-256, SHA-348, SHA-512 and others.

Once each volume has been divided into chunks and the chunks hashed into codes, in step 220 the codes of each volume are compared with the codes of the corresponding chunks of other volumes in the temporary group. The number of matched codes indicates how much commonality the volumes have. Thus, the distance of each chunk of each volume is calculated and the distances are summed to determine total distance. The distances may be calculated using vector matching or quantization, wherein the codes are defined as a vector or scalar, and the distance between the scalars are calculated as a vector product. Other methods may also be used for calculating distances. In step 221, the volumes are sorted based upon the summed distances to determine the volume having the greatest degree of commonality. In step 222, a neighborhood group is created with the volume determined in step 221 as having the greatest commonality being set as the temporary base volume for the neighborhood group.

Step 230, including steps 231, 232, 233 and 234, is carried out for each volume starting from the second volume from the base volume as sorted in step 221. In step 231, the distance of the volume from the temporary base volume is calculated. In step 232, the distance calculated is compared with a distance threshold, which will be discussed in greater detail below. If the calculated distance is less than or equal to the distance threshold, then in step 234 the volume is included in the neighborhood group for the temporary base volume from which it has the least calculated distance. For example, several temporary groups may be examined simultaneously, and the volume may be compared for distance from the temporary base volumes of each of these groups. Then the volume is placed in the group with which it has the greatest degree of commonality, i.e., in which the calculated distance from the base volume is the least. However, if the calculated distance is greater than the distance threshold, then in step 233, the volume may be removed from the temporary group and possibly used to create another temporary group if multiple groups are being formed simultaneously. Furthermore, if the volume is always outside the distance threshold, then the volume will not be able to be part of any group.

Finally, in step 235, once the processing for each volume in the temporary group has taken place, and one or more neighborhood groups have been identified, any neighborhood group having only one volume is eliminated from further processing, since no data reduction will be possible. Further, if the neighborhood group does not satisfy certain predefined criteria, it may also be eliminated from further processing. The distance threshold (step 232) and/or the predefined criteria (step 235) may be given by a user. For example, for defining a distance threshold, the maximum value of the distance may be calculated, and a percentage of this may be used as the threshold. Thus, if the scalar product is used for calculating the distance, the max should be 180 degrees, and the threshold would be a percentage of this, depending on the target degree of data reduction.

Further, the max minus the distance calculated for each chunk or volume indicates how similar the chunk or volume is to base chunk or volume. This indicates the degree to which the stored data can be reduced. Therefore, the max minus the threshold should correspond to the service level objective defined by the user. Thus, the expected ratio of data reduction may be estimated by calculating average distances or how close volumes in the neighborhood group are to each other (i.e., how similar in data content). In step 235, the user may set the threshold ratio as the predefined criteria, and compare it with the expected ratio.

In another embodiment, a user may specify particular expected data reduction ratios such as "Gold", "Silver" and "Bronze" as part of a SLA (service level agreement). Then the system may define the threshold or the criteria based on the SLA using predefined rules.

Process of Defining a Base Volume

After the execution of the processes described in FIG. 4, one or more one neighborhood groups are defined; otherwise, the user may change the thresholds while taking into account a consideration of the impact of such changes. The processes explained in FIG. 5A or 5B are then executed toward each neighborhood group.

Figure 5A:
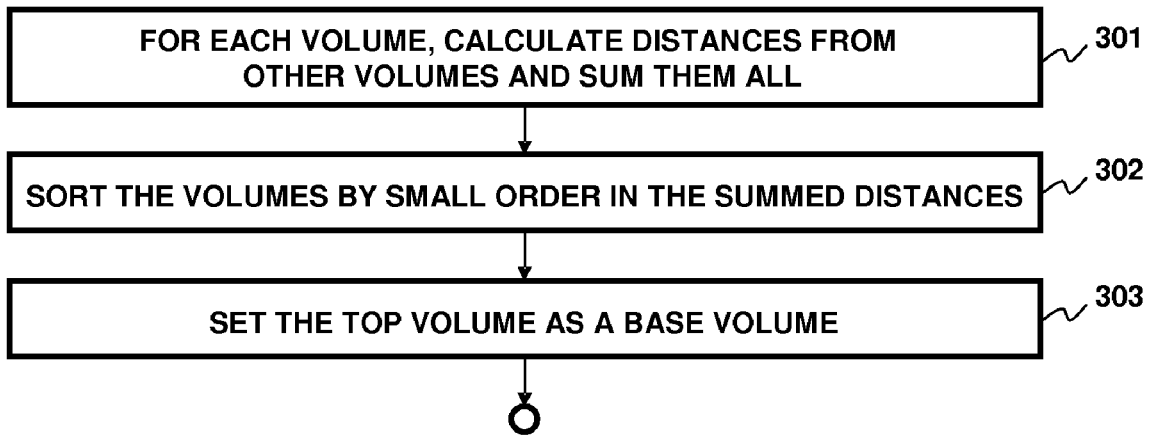
FIG. 5A illustrates an exemplary process of defining a base volume.

FIG. 5A shows an exemplary process of defining a base volume, which is a process of selecting a mode in the neighborhood group, (i.e., the volume having the greatest degree of commonality). In FIG. 5A, step 301 corresponds to step 221 of FIG. 4, step 302 corresponds to step 222 and step 303 corresponds to step 223 of FIG. 4. The process of FIG. 5A may be used if the neighborhood group is predefined and the process of FIG. 4 is not utilized. Alternatively, the process of FIG. 5A may be used to choose an optimum volume for the base volume by eliminating any influence from volumes in other neighborhood groups, which is not taken into account during the process of FIG. 4. Thus, the process of FIG. 5A is used to ensure that the base volume has the greatest degree of commonality in the neighborhood group.

Figure 5B:
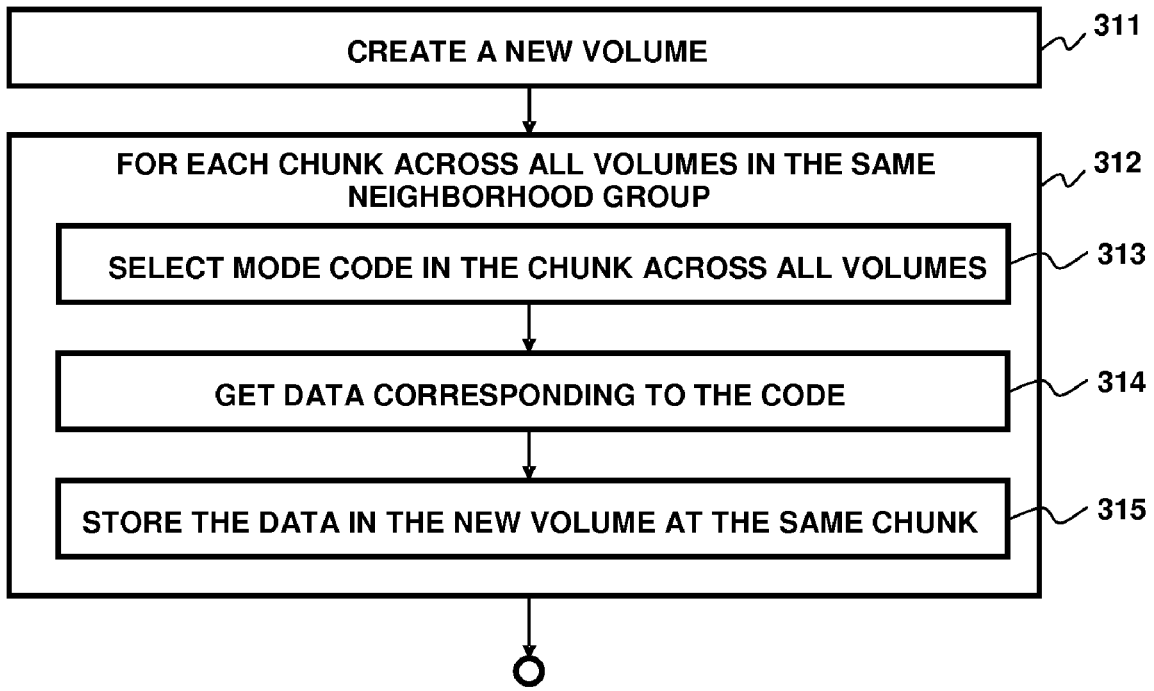
FIG. 5B illustrates another exemplary process of defining a base volume.

FIG. 5B shows another exemplary process of defining a base volume, in which a volume is newly created and filled with data that correspond to a mode code in each chunk, i.e., the version of the chunk in the volumes of the group that has the most commonality among the volumes is used for the corresponding chunk of each chunk of the base volume. Before the system creates a new volume, expected data reduction may be calculated based upon the number of matching codes, and the system may confirm that it can reduce data in spite of creating a new volume. In some situations, it may be advantageous to create a new volume as the base volume rather than using an existing volume as the base volume, since this enables commonality to be considered according to each chunk rather than the entire volume, thus enabling the creation of a base volume have greater commonality with all the volumes in the group than can be found in any single existing volume in the group.

Accordingly, in this variation of the invention, in step 311, a new volume is created. Next, in step 312, for each chunk across all volumes in the neighborhood group, steps 313-315 are carried out. In step 313 the first chunks of each of the volumes are compared to determine if the codes are the same or different, and a mode code is determined for the first chunk, which is the code that greatest number of the volumes have in common. The data corresponding to this mode code is retrieved in step 314, and is stored as the first chunk of data in the new base volume at step 315. The process is repeated for the second chunk, the third chunk, etc., for the volumes of the group, until all chunks have been examined. Thus, it may be seen that in this manner a base volume having optimal commonality with all volumes in the group may be created.

Process of Updating Mapping Table

Figure 6:
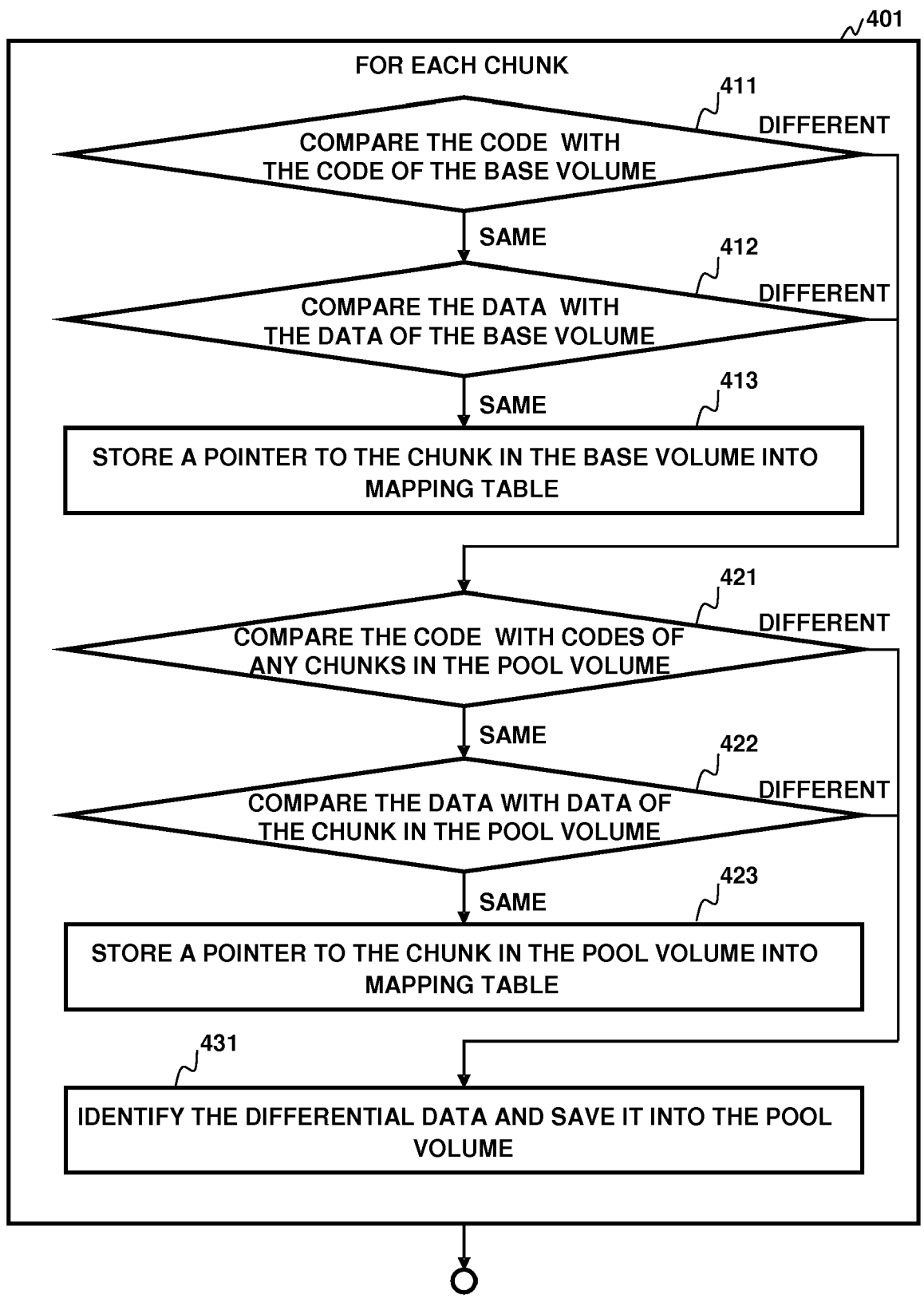
FIG. 6 illustrates an exemplary process of extracting differential data between the base volume and the specified volume, saving the differential data in the pool volume if it is new, and updating the mapping table.

Once the neighborhood group and the base volume for the group have been established, the system begins mapping of the chunks of the volumes in the group, other than the base volume, into the mapping table, thereby converting the volumes to virtual volumes. FIG. 6 shows an exemplary process of extracting differential data between the base volume and each specified volume of the group, saving the differential data in the pool volume if it is new differential data, and updating the mapping table. Comparing codes (steps 411 and 421) may be used for a fast-track checking. However, it is not an entirely accurate data comparison because a hashing conflict may occur, so bit-to-bit comparison (steps 412 and 422) is executed for only the chunks that have passed steps 411 or 421. In other words, only a limited number of chunks will be targets of the more expensive and time-consuming bit-to-bit comparison.

Step 401 indicates that steps 411-431 are carried out, as applicable, for each chunk of each volume. In Step 411 the code is compared with the corresponding code of the base volume in the same chunk number (i.e., the code of the first chunks of the volumes are compared the first chunk of the base volume, the codes of the second chunks are compared with the second chunk of the base volume, and so forth). If the codes match, then there is a possibility that the data is exactly the same, and therefore redundant. Accordingly in step 412, the data corresponding to the chunk of the volume is compared on a bit-to-bit basis with the data of that chunk of the base volume. In step 413, if the data is found to be an exact match, then a pointer is stored for that chunk of the volume in the mapping table pointing to the chunk in the base volume, as will be described below in reference to FIG. 8. On the other hand, if in step 411 or 412 the comparison shows that the chunks are different, then the process proceeds to step 421. In step 421, the chunk of the volume being examined is compared with any chunks already stored in the pool volume. Thus, the code of the chunk is compared with those chunks already existing in the pool volume, and if a match is found, the process proceeds to step 422 for a bit-to-bit comparison of the data corresponding to the chunks. If the bit-to-bit comparison in step 422 shows that the data in the chunk matches data already stored in the pool volume, then a pointer for that chunk of the volume being examined is stored in the mapping table pointing to the matching chunk in the pool volume. However, if either step 421 or 422 reveals that the chunk does not match any chunk already stored in the pool volume, then in step 431, the data corresponding to the chunk is stored into the pool volume and a pointer pointing to the data is stored in the mapping table for the chunks of the volume being examined. Once examination of the specific volume is complete, and pointers for all chunks of the volume have been mapped, the volume may be deleted, and will only exist as a virtual volume defined by the mapping table. In this manner all the volumes in the group may be converted to virtual volumes as illustrated in FIG. 3B, and the physical data of the volumes may be deleted from the storage system, with the exception of the data existing in the base volume, the pool volume, and the mapping table.

Structure of Pool Volume

Figures 7, 8:
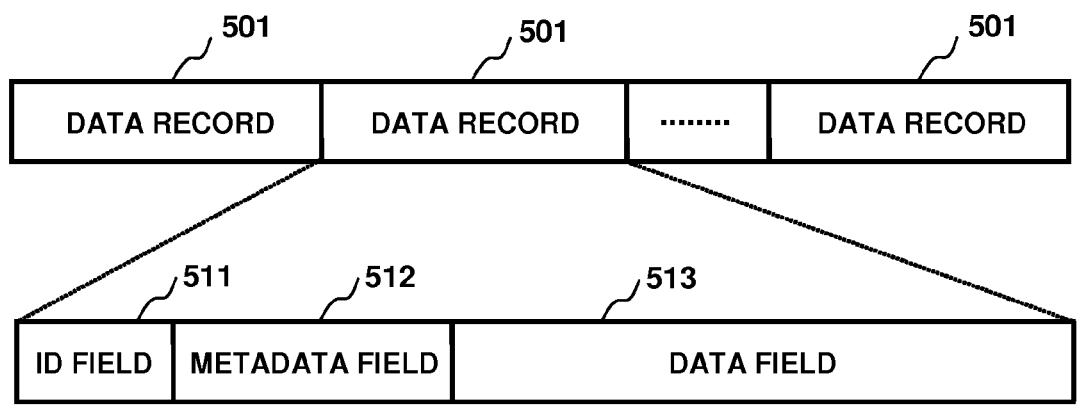
FIG. 7 illustrates an exemplary structure of the pool volume.
FIG. 8 illustrates an exemplary structure of the mapping table.

FIG. 7 shows an exemplary structure of the pool or differential volume. Several pool volumes may exist in a storage system, and each of them will have a unique name for storing differential data extracted from the volumes of a group. The structure of the pool volume of the present invention may be a structure similar to an ordinary COW pool volume, having a plurality of data records 501. Each data record 501 may include an ID field 511, metadata 512 and the data 513 itself for each chunk. The pool volume name and the ID field 511 specify a specific data chunk, and will be pointed to by one or more pointers stored in the mapping table. The pool volume may be allocated after each neighborhood group is extracted.

The size of the pool volume can be calculated in advance based on the average distance between volumes.

Structure of Mapping Table

FIG. 8 shows an exemplary structure of a mapping table 560 that maintains the data locations to enable retrieving data of the virtual volumes from data stored in the pool volume of FIG. 7 and the base volume. The mapping table 560 contains pointers to real data for each virtual volume and its chunks. Mapping table includes a listing for each virtual volume, including volume ID 561 and each chunk of the volume identified by chunk ID 562. Mapping table 560 also includes a pointer for each chunk, with the pointer being identified by volume ID 563, which is either the pool volume or the base volume, and chunk ID 564, which is a chunk in either the pool volume or the base volume corresponding to the chunk ID of the virtual volume. For example, in the case of the row 552, the chunk 10 of the volume 123 points to the data in the chunk 10 of BVOL1 (a name of a base volume). Also, in case of the row 553, the chunk 11 of the volume 123 points to the data in the chunk 11 of POOL1 (a name of a pool volume). Thus, to retrieve the data of volume 123, the data will be retrieved from the base volume or the pool volume, depending on where the pointers point to for each particular chunk of volume 123.

System Architecture

Figure 9A:
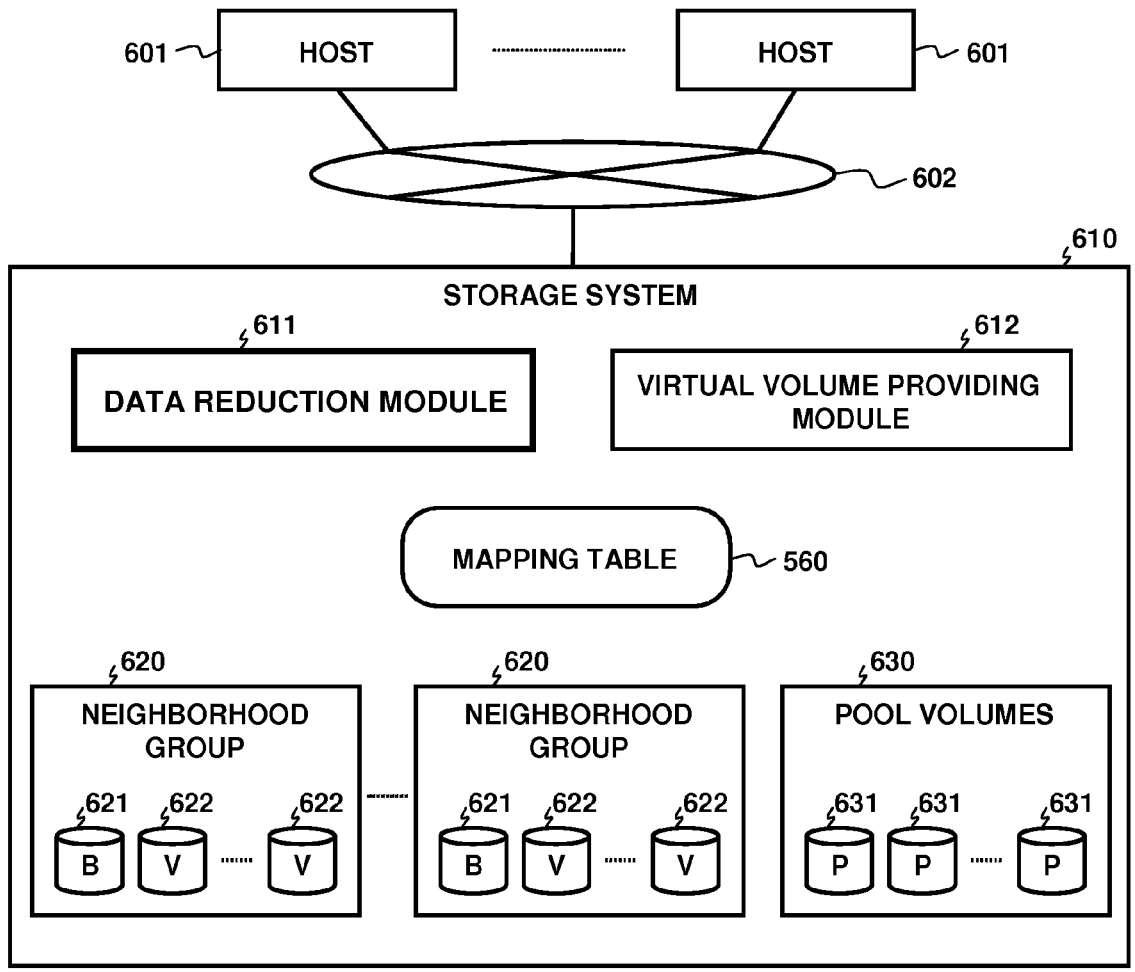
FIG. 9A illustrates an exemplary system architecture.

FIG. 9A illustrates an exemplary system architecture with which the system and method of the present invention may be utilized. The virtual volume providing means of a conventional COW implementation may be reutilized with little modification. Also, the mapping table and the pool volume of a conventional COW implementation may be reutilized with little modification. This allows low-cost implementation of the present invention.

Accordingly, the system illustrated in FIG. 9A includes one or more hosts 601 connected via a network 602 to a storage system 610. Storage system 610 includes a plurality of storage devices that are logically represented as volumes to the hosts 601. Under the invention, as described above, these volumes are classified into one or more neighborhood groups 620 and one or more pool volumes 630. Each neighborhood group 620 includes a base volume 621 and one or more virtual volumes 622 representing the volumes that have been deleted through the data reduction technique of the invention. The storage system includes as software a data reduction module 611 of the invention that carries out the processes set forth in FIG. 1. Data reduction module 611 and the other software for carrying out the invention may be stored in a computer readable medium, such as a memory, hard disk, optical disk or other known storage medium. Also included is mapping table 560 for retaining the relationship of the chunks of each virtual volume, as described above. Further, as discussed above, much of the functionality of the virtual volume providing module 612 and the mapping table 613 may be derived from existing COW technologies.

Figure 9B:
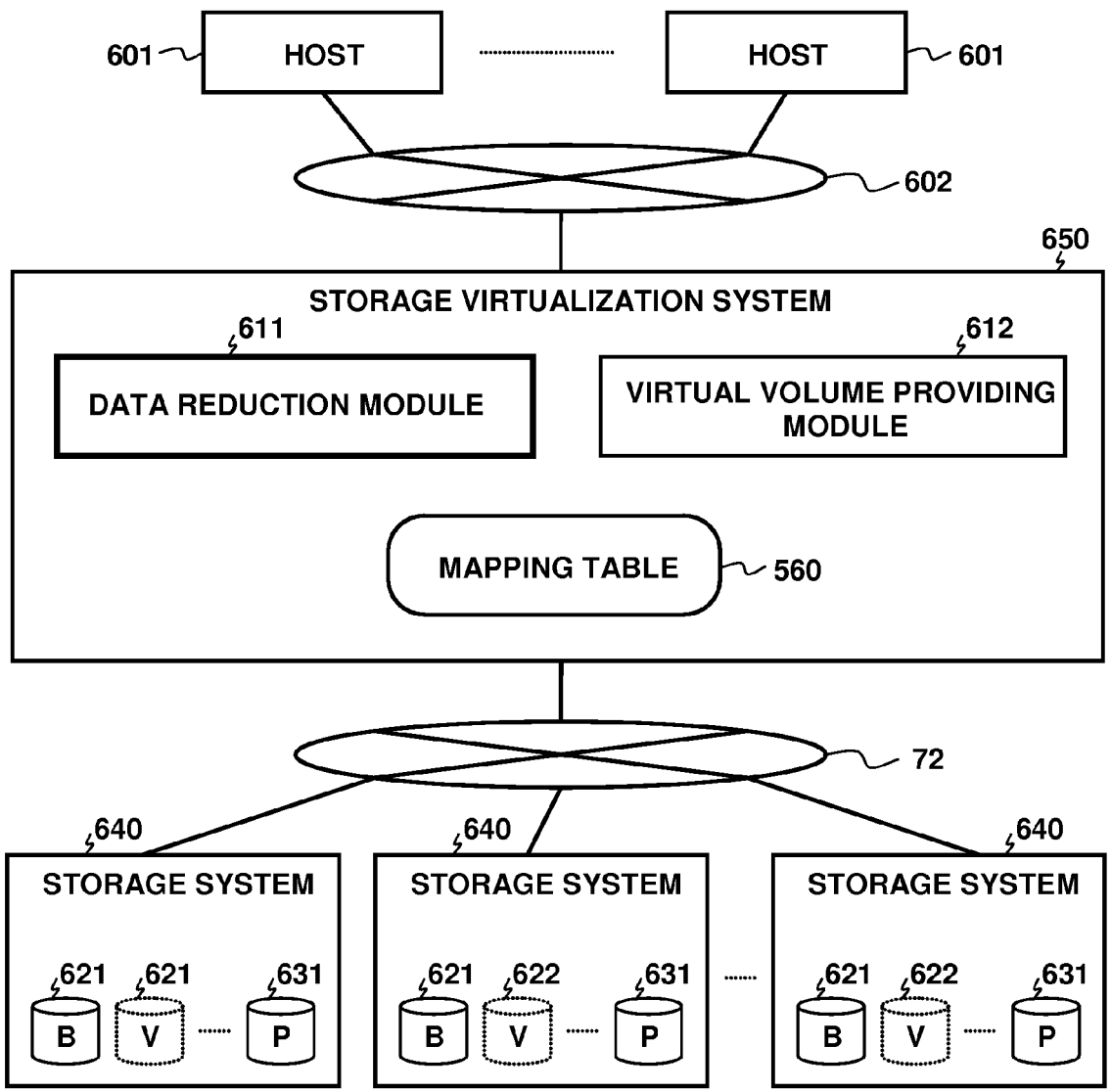
FIG. 9B illustrates an exemplary system architecture when the invention is applied to a storage virtualization system.

FIG. 9B shows an alternative exemplary system architecture when the invention is applied to a storage virtualization system 650 rather than a single storage system. In this case, the data reduction process of the invention is executed toward volumes in external storage systems 640. In other words, a neighborhood group may contain volumes across external storage systems 640, which is useful in the case of remote copy or the like (i.e. more redundant data may exist). Further, the pool volume 631 for a particular neighborhood group may be retained in the same external storage system as the base volume 621 for that group. The data reduction module 611 may be realized as software program implementing the process described in FIG. 1, and which is stored in a computer readable medium. The storage virtualization system 650 is a system known in the art for presenting multiple external storage systems 640 as a single storage system to hosts 601, while the external storage systems 640 are actually in communication with the virtualization system 650 via a network 72, such as a fibre channel network.

Alternative Embodiment

Figure 10:
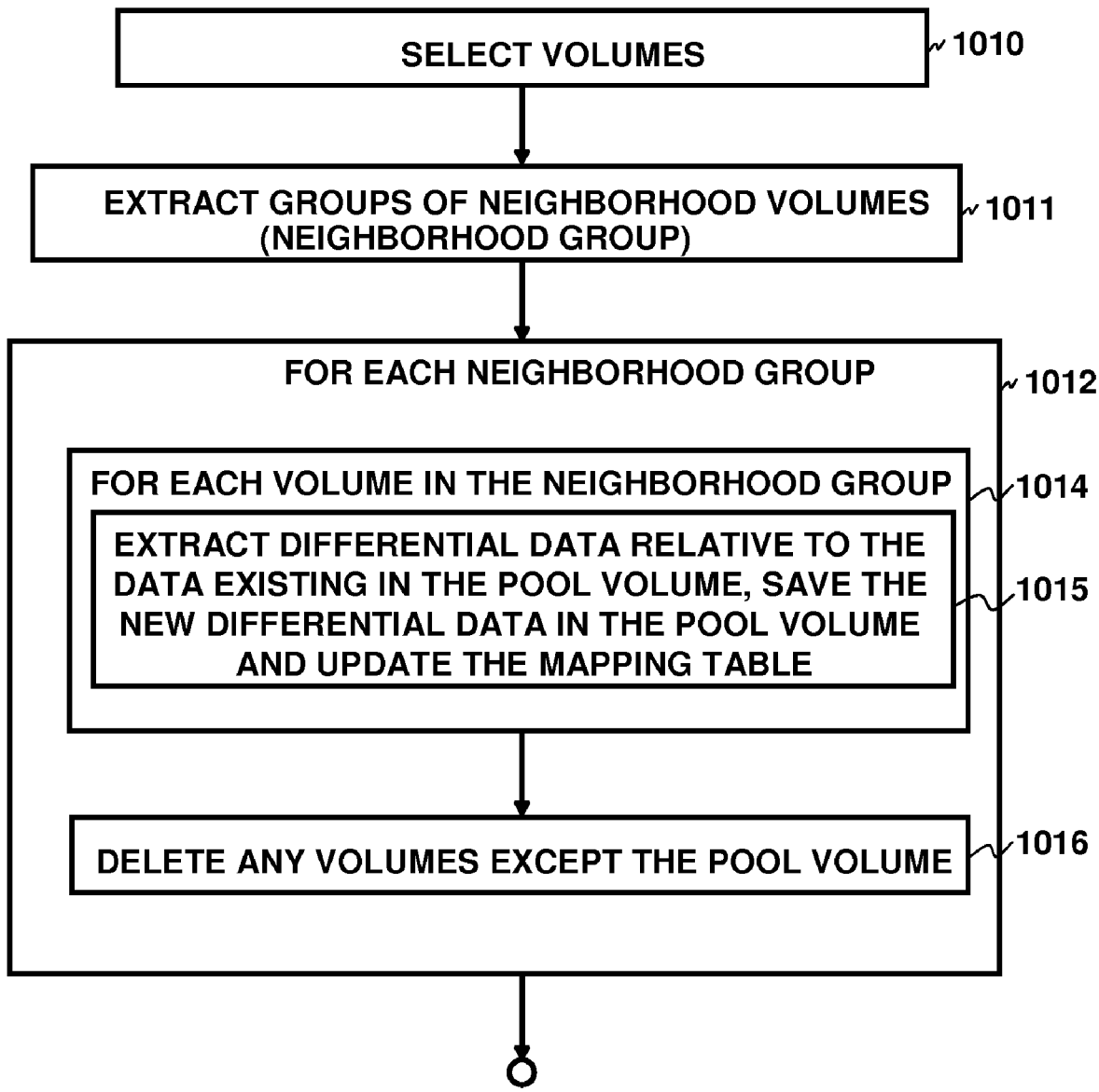
FIG. 10 illustrates an overall process of another alternative embodiment of the invention.

In an alternative embodiment, illustrated in FIG. 10, all of the volumes in the neighborhood group are converted to virtual volumes, which is defined as a set of pointers to chunks in the pool volume, and there is no base volume. Thus, in step 10, it is not necessary to select the same size of volumes when selecting volumes for a group, and only commonality among some chunks is a prerequisite for belonging to a group. Thus, in step 1010, volumes having some commonality are selected, either by the system according to replication information or by the user, as discussed above in the first embodiment. Next, in step 1011, groups of neighborhood volumes are extracted based upon calculated distances, as discussed in FIG. 4 above. However, in this case, a group may be determined by comparing codes of chunks of the selected volumes with one another for determining commonality. Thus, in order to extract neighborhood groups, a volume is considered as a set of chunks. In other words, the sequence of the chunks may be ignored. Then, the distance between volumes is calculated, and the volumes in a certain distance are categorized into the same neighborhood group.

Under step 1012, once a group has been identified, steps 1014-1016 are carried out for the group. In this embodiment, all pointers in the mapping table point to chunks of data located in the pool volume. Because there is no base volume, the processes of FIGS. 5A and 5B are not executed. Thus, under step 1014, for each volume in the group, step 1015 is carried out. In step 1015, differential data is extracted for each chunk of each volume relative to the data already existing in the pool volume. Thus, in step 1015, steps 411-413 in FIG. 6 are not executed, and instead, only steps 421-431 of FIG. 6 are executed for storing a pointer to a chunk in the pool volume into the mapping table or saving new differential data to the pool volume. Furthermore, in FIG. 8, there is no pointer to a base volume, and all pointers are instead to the pool volume. Also, in FIGS. 9A and 9B, the base volumes 621 are eliminated. Once all differential data has been extracted for the volumes and pointers stored in the mapping table, the volumes may be deleted in step 1016. Thus, under this embodiment, all of the volumes in a group are converted to virtual volumes, with the pool volume retaining all the data and the volumes of the group existing as virtual volume by means of the mapping table and pool volume. The embodiment illustrated in FIG. 10 is useful for products or technologies which do not utilize any base volumes to realize COW.

The invention may be applied to a number of different types of storage systems and facilities, such as archive systems, backup systems, content-aware storage systems (CASs), fixed-content archive storage systems, and information lifecycle management (ILM) or data lifecycle management (DLM). Also, the mechanism for mapping the pointers to the chunks may be leveraged from existing COW implementation and applied to the invention, so development costs can be reduced. In other words, the virtual volume providing module may be modified from existing implementations and used to provide data access in the deleted volumes of a group to hosts. The commonality between volumes in the neighborhood group is managed in the base volume, the pool volume and the mapping table, or in just the pool volume and the mapping table. Thus, the present invention enables most or all of the original volumes to be deleted, and as a result, the actual amount of data stored can be reduced while maintaining data accessibility. Accordingly, the present invention reduces the overall amount of data stored in a storage system by automatically seeking out and eliminating the storage of unnecessary redundant data.

While specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A method for managing data in a storage system comprising the steps of:
    selecting a set of volumes in which an amount of stored data should be reduced;
    converting said selected set of volumes into a base volume and a virtual volume, wherein said volume includes a pool volume;
    wherein said selecting is performed by determining a group of volumes having a commonality of data, and
    wherein said base volume includes said data having commonality and said pool volume and includes extracted differential data between the base volume and each other volume in said group, and wherein said mapping table includes information regarding a location of the differential data in said pool volume.

2. The method according to claim 1,
    wherein said set of volumes include a set of copy generation volumes.

3. The method according to claim 1,
    wherein said selecting is performed based on configuration information of data replication.

4. The method according to claim 3,
    wherein said selecting is performed by the system automatically.

5. The method according to claim 1,
    wherein during said conversion write I/Os are buffered.

6. The method according to claim 1, further comprising the step of:
    deleting other volumes other than said pool volume and base volume so as to reduce the amount of data stored in said storage system.

* * * * *